United States Patent [19]
Maignan et al.

[11] Patent Number: 5,442,360
[45] Date of Patent: Aug. 15, 1995

[54] ECHO DISTANCE-MEASURING SYSTEM WITH CALIBRATION APPARATUS

[75] Inventors: Michel Maignan, Morangis; Gilles Vendrome, Longpont-sur-Orge, both of France

[73] Assignee: Alcatel N.V., Amsterdam, Netherlands

[21] Appl. No.: 958,333

[22] PCT Filed: Apr. 28, 1992

[86] PCT No.: PCT/FR92/00377
§ 371 Date: Dec. 21, 1992
§ 102(e) Date: Dec. 21, 1992

[87] PCT Pub. No.: WO92/19985
PCT Pub. Date: Dec. 11, 1992

[30] Foreign Application Priority Data
Apr. 29, 1991 [FR] France .................. 91 05250

[51] Int. Cl.$^6$ .................. G01S 7/40; G01S 13/40
[52] U.S. Cl. .................. 342/120; 342/123; 342/174; 342/172
[58] Field of Search .................. 342/128, 26, 118, 123, 342/133, 146, 172, 174, 175; 356/5

[56] References Cited

U.S. PATENT DOCUMENTS

| | | | |
|---|---|---|---|
| 3,577,144 | 5/1971 | Girault | 356/5 X |
| 4,167,328 | 9/1979 | Cross et al. | 356/5 |
| 4,274,736 | 6/1981 | Balmer | 356/5 |
| 4,432,640 | 2/1984 | Grage et al. | 356/5 |
| 4,451,146 | 5/1984 | Grage et al. | 356/5 |
| 4,518,256 | 5/1985 | Schwartz | 356/5 |
| 4,553,836 | 11/1985 | Meier et al. | 356/5 |
| 4,620,788 | 11/1986 | Giger | 356/5 |
| 4,683,473 | 7/1987 | Haugland | 342/172 |
| 4,770,526 | 9/1988 | Manhart et al. | 356/5 |
| 4,856,893 | 8/1989 | Breen | 356/5 |
| 5,019,826 | 5/1991 | de La Chapelle et al. | 342/202 |
| 5,153,933 | 10/1992 | Smith et al. | 385/27 |
| 5,164,734 | 11/1992 | Fredericks et al. | 342/172 |

FOREIGN PATENT DOCUMENTS 2546307 11/1984 France .
2003358 3/1979 United Kingdom .
2218588 11/1989 United Kingdom .

OTHER PUBLICATIONS

I. L. Newberg, "Long Microwave Delay Fiber-Optic Link for Radar Testing", May 1990, *IEEE Transactions on Microwave Theory and Techniques*, vol. 38, No. 5, May 1990, pp. 664–666.

Primary Examiner—John B. Sotomayor
Attorney, Agent, or Firm—Robbins, Berliner & Carson

[57] ABSTRACT

The calibration apparatus (16) includes a recirculating optical delay loop (22) constituted by two delaying fibers (F2, F3), an optical amplifier (28), and a coupler (26) for providing a succession of a plurality of delayed optical signals (OR) in response to a single initial signal (OA). The invention is particularly to radars.

6 Claims, 1 Drawing Sheet

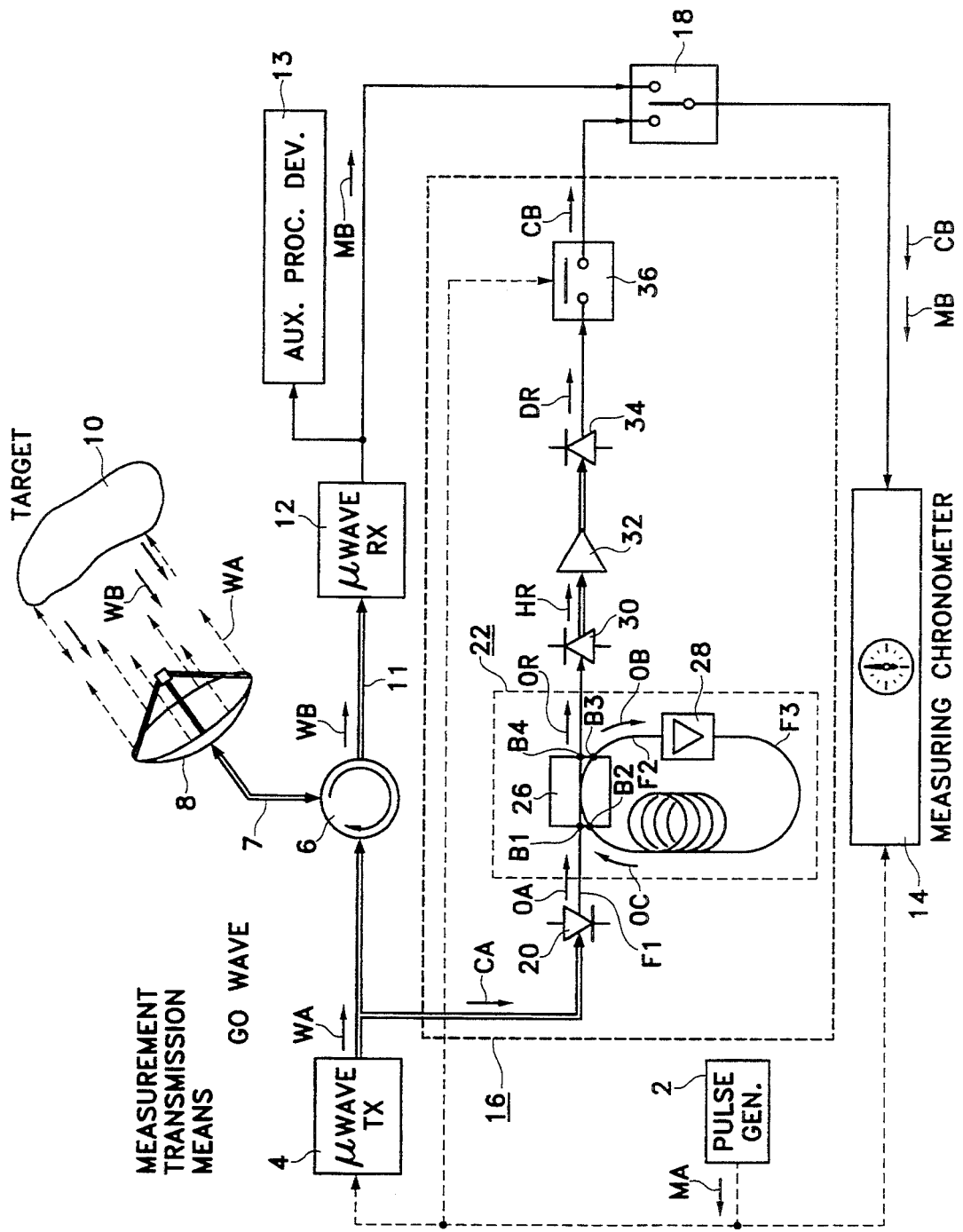

ECHO DISTANCE-MEASURING SYSTEM WITH CALIBRATION APPARATUS

TECHNICAL FIELD

The present invention relates in general to measuring distances, and more particularly to radars or altimeters that make use of microwave echoes. It is nevertheless also applicable to systems such as sonars or lasar rangefinders which use different types of wave.

BACKGROUND ART

Accurate calibration of very long range radars or altimeters on board satellites is difficult to achieve using active targets because microwave delay lines having a duration of several milliseconds are not available for this purpose.

Ever since the invention of radar, calibration targets have been used for range calibration. Such passive targets constituted by metal reflectors must have a radar cross-section that is large enough to ensure that the power ratio of target echoes to clutter echoes from the ground and from the environment is sufficient for the desired calibration to be obtained accurately. Such targets are bulky, difficult to move, expensive, and they often depend on the polarization of the incident wave. That is why active calibration targets have been developed which are constituted by a receiver antenna and a transmitter antenna interconnected by an amplifier. They are smaller in size and the power of their echoes improves calibration accuracy. All such targets must be placed in the field of the radar and this cannot always be done, e.g. when using a long range radar or an altimeter radar on board a satellite or an aircraft. In addition, they are still subject to ground echoes. To be able to move the radar target closer, it is necessary to transform it into an echo simulator, i.e. to provide an active target with a delay line on the path followed by the microwave signals.

An article on this topic is "Delayed action reflector for external calibration of synthetic aperture radar" by K. Komiyama, published in Electronics Letters, 30 Mar. 1989, Vol. 25, No. 7, p. 468.

Acoustic or electronic microwave delay lines are not suitable for obtaining delays that are as large as is desired. That is why proposals have been made to use optical delay lines for calibration purposes, which delay lines are constituted by long delay-providing optical fibers. The low attenuation of an optical fiber makes it possible to achieve long delays, and the wide band width thereof makes it possible to carry the microwave signal directly on the lightwave without changing frequency.

It is also advantageous to observe that the delay achieved in this way is not sensitive to the type of radar pulse used because of the wide passband of an optical fiber.

The following articles deal with this topic:

"Wideband 150 µs optical delay line for satellite altimetric radar checking" by M. Maignan, J. J. Bernard, P de Chateau Thierry, Electronics Letters, 7 Jul. 1988, Vol. 24, No. 14, p. 902;

"Radar applications of X-band fiber optic links" by I. L. Newberg, C. M. Gee, G. D. Thurmond, 0149-645X/88/0000-0987$01.00 c 1988 IEEE; and "Long microwave delay fiber optic link for radar testing" by I. L. Newberg, G. D. Thurmond, W. Yen, IEEE Transactions on microwave theory and techniques, Vol. 38, No. 5, May 1990.

DISCLOSURE OF INVENTION

A particular object of the present invention is to provide calibration corresponding to distances to be measured that are greater and/or adjustable, this being done by means of an optical delay line in a manner that is simple and optionally "stealthy". Another object of the invention is to provide calibration apparatus including said delay line which is light in weight and compact. Such qualities make it possible to integrate the apparatus in the measuring system in the event that the measuring system is constituted by a single integrated assembly. Otherwise, such qualities make it possible to integrate the apparatus in an active calibration target functionally included in the measurement system but physically separate therefrom. More generally, an object of the invention is to make it possible in simple manner to form a regular succession of output pulses from an initial pulse, or to make it possible to select one of said output pulses.

According to the invention, calibration apparatus includes an optical delay loop, such a loop including at least one retarding optical fiber and an optical coupler for recirculating signals, thereby providing a succession of a plurality of delayed optical signals in response to the same initial optical signal.

Such an optical delay loop apparatus may be used not only for making an active target for calibrating long range radars under protected conditions, but also for calibrating a radar in operation without needing to emit a signal that can be detected externally (in which case a path switcher can be used). In addition, it is possible to envisage using the apparatus on board a satellite for the purpose of calibrating an altimetric radar accurately.

BRIEF DESCRIPTION OF DRAWINGS

An implementation of the present invention is described below by way of example and with reference to the accompanying figure.

This figure is a block diagram of a system of the present invention.

BEST MODE FOR CARRYING OUT THE INVENTION

The system includes transmission means 2, 4, 6, and 8. These means are referred to below as "measurement transmission means". They provide an initial measurement signal MA that is electrical and they transmit an outgoing wave WA constituted by scanning radiation which is modulated with said signal in a known time relationship. More particularly, they comprise a pulse generator 2 which provides the measurement signal in the form of a short pulse, and a microwave transmitter 4 which responds thereto by providing the outgoing wave. A waveguide 5 conveys said wave to a duplexer 6 which in turn conveys it via a waveguide 7 to an antenna 8.

The system also includes reception means referred to as "measurement reception means" 8, 6, 12. These means receive a return wave WB constituted by an echo of the outgoing wave returned by a target 10. They respond by providing a final measurement signal MB that is electrical and that has a predetermined time relationship with said return wave.

More particularly, the antenna 8 receives the wave returned by the target 10 and directs it via the waveguide 7, the duplexer 6, and a waveguide 11 to a microwave receiver 12 which provides the final measurement signal MB. This signal is processed, in particular, in an auxiliary processor device 13 for measuring target parameters other than range, depending on user requirements.

A measuring chronometer 14 is disposed to receive firstly an initial counting signal MA which, at least in a measurement configuration of the system, is constituted by the initial measurement signal MA. The chronometer then receives a final counting signal which, in the same measurement configuration, is constituted by the final measurement signal MB. The function of the chronometer is to deliver a value representative of the time delay between said final counting signal and said initial counting signal. This value is referred to below as the "delay" value. In said measurement configuration, this delay value is representative of the range of the target 10.

More particularly, the initial counting signal is always constituted by the initial measurement signal MA.

The calibration apparatus 16 of the system is designed to receive an initial calibration signal CA and to provide at least one final calibration signal CB having a known calibrated delay relative to said initial calibration signal. These initial and final calibration signals constitute said initial and final counting signals in a calibration configuration of the system. They then enable a calibration operation to be performed which calibrates the measuring chronometer 14 and during which said final calibration signal constitutes a simulation of one of said echoes.

The internal structure of the calibration apparatus is described below.

Configuration switching means enable the system to be placed in alternation or simultaneously in its measurement configuration and its calibration configuration. These means are more particularly constituted by a path switcher 18 when the measurement system includes a single body. Nevertheless, they could be constituted differently, e.g. by means for activating an active calibration target in the event that the measurement system includes such a target.

The path switch 18 receives the final measurement signal MB and the final calibration signal CB and it directs one or other of these signals to the chronometer 14 to constitute the final counting signal.

The calibration apparatus 16 includes optical means 20 for providing an initial optical signal OA in a predetermined time relationship relative to the initial calibration signal CA. More particularly, this optical means is constituted by a light emitter which receives a fraction of the wave emitted by the microwave transmitter 4 in response to the initial measurement signal MA. This signal is provided at the beginning of the calibration process as at the beginning of a range-measuring process. This fraction constitutes the initial calibration signal CA.

In conventional manner, the calibration apparatus further includes an optical delay line (F2, F3) constituted by at least one optical fiber. Such a delay line has an input B3 for receiving line input signals such as the initial optical signal OA. It also has a line output B2 on which it delivers a line output signal OC in response to each of the line input signals, but with a line delay that is calibrated relative to the line input signal. The line output signal gives rise to a delayed optical signal OR.

The internal structure of this member is specific to the present invention and enables it to provide not only one such delayed optical signal, but many of them. It is described in greater detail below.

A detector assembly receives each delayed optical signal OR. It responds by providing a detected delayed signal DR, with the final calibration signal CB being constituted by such a detected delayed signal.

In accordance with the present invention, the optical delay line comprises an optical delay loop 22 which also includes an optical coupler 26. The coupler has a first terminal B1 constituting a loop input for receiving the initial optical signal OA. A second terminal B2 constitutes said line output for receiving line output signals OC. A third terminal B3 constitutes said line input for injecting a circulating fraction of the initial optical signal and of each of the line output signals into said optical delay line so that the fractions injected in this way constitute said line input signals OB, thereby recirculating said signals. The delay line then constitutes a unit delay. Finally, the coupler 26 has a fourth terminal B4 constituting a loop output for providing a succession of delayed optical signals OR respectively constituted by outgoing fractions of the line output signals OC. Compared with the initial optical signal OA, these delayed optical signals have calibrated delays equal to the unit delay multiplied by successive integers.

The loop 22 also includes a loop amplifier 28 which is an optical amplifier inserted in series to compensate in part for the energy losses to which the line input and output signals are subjected in said loop and in the optical coupler.

More particularly, the optical delay line is constituted by a first optical fiber F2 feeding the amplifier 28 and a second fiber F3 of the same length and fed by said amplifier.

The detector assembly 30, 32, and 34 receives the delayed optical signals OR and responds by delivering a corresponding succession of detected delayed signals DR. More particularly, said assembly includes an optical detector 30 for providing a delayed microwave signal HR in response to each delayed optical signal OR, a microwave amplifier 32 for amplifying said delayed microwave signal, and a microwave detector 34 for providing a detected delayed signal in response to said delayed microwave signal HR.

The calibration apparatus further includes a signal selector 36 receiving said succession of detected delayed signals DR and stopping an initial fraction of said succession. The first detected delayed signal is not stopped and is transmitted to the output of the calibration apparatus 16 to constitute the final calibration signal CB.

The signal selector 36 is triggered by a selection trigger signal MA having a known time relationship relative to the initial calibration signal CA for the purpose of selecting the final calibration CB from the succession of detected delayed signals DR. More particularly, this selection trigger signal is constituted by said initial measurement signal MA.

The final calibration signal may be selected by counting detected delayed signals. For example, the selector 36 then stops the first four detected delayed signals and passes the fifth signal to constitute the final calibration signal for stopping the chronometer 14. The number of signals that are stopped is adjustable. This selection may also be performed by stopping the detected delayed signals for an adjustable predetermined time lapse which does not need to be determined with great accuracy since it merely needs to terminate in the gap between two successive detected delayed signals.

The delay presented by the final calibration signal CB relative to the initial calibration signal CA is thus made equal to an adjustable integer number of calibrated unit delays.

By way of example, the light emitter 20 may be constituted by a semiconductor that is capable of being modulated by current. Its optical emission power is 1 mW and this is injected into an input fiber F1 of the optical coupler 26. Its intensity noise density is −150 dBm/Hz.

The optical coupler 26 may present the following coupling factors:

from terminal B1 to terminal B4: 45%
from terminal B1 to terminal B3: 45%.

The optical amplifier 28 may be constituted by an erbium-doped optical fiber that is optically pumped. It may then have the following characteristics:

gain = 22 dB;
spontaneous emission power density = −20 dBm/nm; and
optical filter width = 0.3 nm.

Each of the optical fibers F2 and F3 may be 50 km long, may have 0.2 dB/km attenuation, and may have a propagation time of 5 microseconds per kilometer, thereby obtaining a unit delay of 500 microseconds.

The optical detector 30 may be constituted by a photodiode loaded by an impedance of 50 ohms.

Under such conditions, if the emitter 20 is modulated with a signal CA in the form of a sinewave pulse with mean power of about +10 dBm, a sequence of detected microwave signals HR is obtained in the form of pulses whose powers at the terminals of the photodiode 30 are approximately as follows:

for the first pulse −30 dBm;
for each following pulse: the power of the preceding pulse reduced by 3 dB.

Under these conditions, noise has a power density of about −150 dBm/Hz.

We claim:

1. A delay line for electrical signals, comprising:
    electrical to optical means for transforming an electrical signal into an optical signal to be delayed;
    an optical delay line for receiving and delaying said optical signal to be delayed, said optical delay line further comprising
        a retarding optical fiber disposed in a loop,
        an optical coupler coupled to said fiber for
            enabling an initial optical signal that is to be delayed to be injected into said fiber and to cause it to travel therealong,
            enabling at least a fraction of an optical signal that has travelled along the fiber to be reinjected therein, and
            enabling at least a fraction of an optical signal that has travelled along the optical fiber to be extracted therefrom, said extracted fraction constituting a succession of delayed optical signals supplied in response to said initial optical signal, and
        a loop amplifier disposed in said loop for amplifying the optical signals travelling along the retarding optical fiber;
    detector means responsive to said extracted fraction for transforming said succession of delayed optical signals into a corresponding succession of detected electrical signals; and
    a signal selector receiving said succession of detected electrical signals and subsequently transmitting only a selected electrical signal corresponding to a predetermined one of said delayed optical signals.

2. Calibration apparatus for an echo distance-measuring system, said calibration apparatus comprising:
    means for transforming an electrical signal into an optical signal to be delayed;
    an optical delay line for receiving and delaying said optical signal to be delayed, said optical delay line further comprising
        a retarding optical fiber disposed in a loop,
        an optical coupler coupled to said fiber for
            enabling an initial optical signal that is to be delayed to be injected into said fiber and to cause it to travel therealong,
            enabling at least a fraction of an optical signal that has travelled along the fiber to be reinjected therein, and
            enabling at least a fraction of an optical signal that has travelled along the optical fiber to be extracted therefrom, said extracted fraction constituting a succession of delayed optical signals supplied in response to said initial optical signal,
        a loop amplifier disposed in said loop for amplifying the optical signals travelling along the retarding optical fiber;
    detector means responsive to said extracted fraction for transforming said succession of delayed optical signals into a corresponding succession of detected electrical signals; and
    a signal selector receiving said succession of detected electrical signals and subsequently transmitting only a selected electrical signal corresponding to a predetermined one of said delayed optical signals.

3. An echo distance-measuring system including calibration apparatus using an optical delay line, the system having a measuring configuration and a calibrating configuration, said system comprising:
    measurement transmission means for providing an initial measurement signal that is electrical and for transmitting an outgoing wave which is modulated by said signal with a known time relationship;
    measurement reception means for receiving a return wave constituted by an echo of said outgoing wave as returned by a target and for providing an electrical final measurement signal having a predetermined time relationship with said return wave;
    a measurement chronometer responsive to an initial count signal which, at least in the measuring configuration of said system, is constituted by said initial measurement signal, and to a final count signal which, in said measuring configuration, is constituted by said final measurement signal, for providing a delay value representative of the delay presented by said final count signal relative to said initial count signal such that, in said measuring configuration, said delay value is representative of the range of said target;
    calibration apparatus for receiving an initial calibration signal and for delivering at least one final calibration signal at a known calibrated delay relative to said initial calibration signal, said initial and final calibration signals constituting said initial and final count signals in the calibrating configuration of said system so as to enable a calibration operation to be performed which calibrates said measurement chronometer and during which said final calibration signal constitutes a simulation of one of said echoes, said calibration apparatus comprising:

optical means for providing an initial optical signal with a predetermined time relationship relative to said initial calibration signal, an optical delay line including at least one delaying optical fiber for receiving said initial optical signal and for responding thereto by delivering a delayed optical signal, and a detector assembly for receiving said delayed optical signal and for responding thereto by delivering a detected delayed signal, said final calibration signal being constituted by one of said detected delayed signals, said detector assembly receiving said succession of delayed optical signals and responding thereto by providing a corresponding succession of said detected delayed signals, and a signal selector receiving said succession of detected delayed signals and stopping an initial fraction of said succession and subsequently transmitting one of said detected delayed signals to constitute said final calibration signal; and configuration switching means for placing said system in its said measuring and/or calibrating configurations;

wherein said optical delay line is an optical delay loop further comprising:

a retarding optical fiber disposed in a loop;

an optical coupler coupled to said fiber, said optical coupler further comprising a first terminal constituting a loop input for receiving said initial optical signal and enabling said initial optical signal to be injected into said delaying optical fiber and to cause it to travel therealong, a second terminal for receiving at least a fraction of optical signals that have travelled along said delaying optical fiber, the delay applied by said fiber on each round trip of said signals constituting a unit delay, a third terminal for enabling at least a fraction of said initial optical signal and of optical signals that have travelled along said delaying optical fiber to be injected into said fiber, thereby recirculating those signals, and a fourth terminal constituting a loop output for enabling at least a fraction of the optical signals that have travelled along the optical fiber to be extracted therefrom, said extracted fraction constituting a delayed optical signal supplied in response to said initial optical signal; and a loop amplifier disposed in said loop for amplifying the optical signal travelling along the retarding optical fiber, said loop amplifier being an optical amplifier inserted in series in said loop to compensate at least in part for the energy losses to which said optical signals are subjected in said loop and in said optical coupler.

4. A system according to claim 3, wherein said outgoing wave is a microwave.

5. A system according to claim 3 wherein said signal selector is responsive to a selection trigger signal having a known time relationship with said initial calibration signal to select said final calibration signal from said succession of detected delayed signals.

6. A system according to claim 4, wherein:

said initial calibration signal is constituted by a fraction of one of said outgoing waves;

said optical means providing said initial optical signal is a light emitter controlled by said initial calibration signal; and said detection assembly further comprises an optical detector for providing a delayed microwave signal in response to each of said delayed optical signals, a microwave amplifier for amplifying said delayed microwave signal, and a microwave detector for providing one of said detected delayed signals in response to said delayed microwave signal.

* * * * *